United States Patent
Shiotani et al.

(10) Patent No.: US 8,262,008 B2
(45) Date of Patent: Sep. 11, 2012

(54) PRETENSIONER, SEAT BELT RETRACTOR HAVING THE SAME, AND SEAT BELT APPARATUS PROVIDED THEREWITH

(75) Inventors: Masahiro Shiotani, Tokyo (JP); Masashi Shimizu, Tokyo (JP)

(73) Assignee: Takata Corporation, Tokyo (JP)

( * ) Notice: Subject to any disclaimer, the term of this patent is extended or adjusted under 35 U.S.C. 154(b) by 259 days.

(21) Appl. No.: 12/659,479

(22) Filed: Mar. 10, 2010

(65) Prior Publication Data

US 2010/0276531 A1    Nov. 4, 2010

(30) Foreign Application Priority Data

May 1, 2009    (JP) .................. 2009-111978

(51) Int. Cl.
*B65H 75/48*    (2006.01)
(52) U.S. Cl. .......................... 242/374; 60/632
(58) Field of Classification Search .............. 242/374; 60/632, 407
See application file for complete search history.

(56) References Cited

U.S. PATENT DOCUMENTS 6,446,897 B1    9/2002    Arima et al.
6,663,037 B2 *  12/2003   Matsumura .......... 242/374

FOREIGN PATENT DOCUMENTS

| DE | 100 10 379 A1 | 9/2000 |
| JP | 2000313314 A * | 11/2000 |
| JP | 2001-63519 | 3/2001 |
| JP | 2002-503168 | 1/2002 |
| JP | 2009-511356 | 3/2009 |

OTHER PUBLICATIONS

European Search Report mailing date of Jun. 24, 2010 for European Application No. 10002517.0.

* cited by examiner

*Primary Examiner* — Sang Kim
(74) *Attorney, Agent, or Firm* — Foley & Lardner LLP

(57) ABSTRACT

A seat belt pretension with improved piston sealing performance. A piston has an expanding section formed at one end thereof contacting a force transmission component. When gas pressure resulting from reactive gas generated by a gas generator causes the piston to exert a pressing force on the force transmission component in the event of an emergency, the expanding section expands toward the inner circumferential surface of a pipe due to the gas pressure. As a result, the outer circumferential surface of the expanding section in the piston comes into contact with the inner circumferential surface of the pipe in a more efficient manner, resulting in enhanced sealing between the piston and the inner circumferential surface of the pipe. This prevents reactive gas from losing gas pressure, thereby allowing the gas pressure to more efficiently act on the piston.

11 Claims, 5 Drawing Sheets

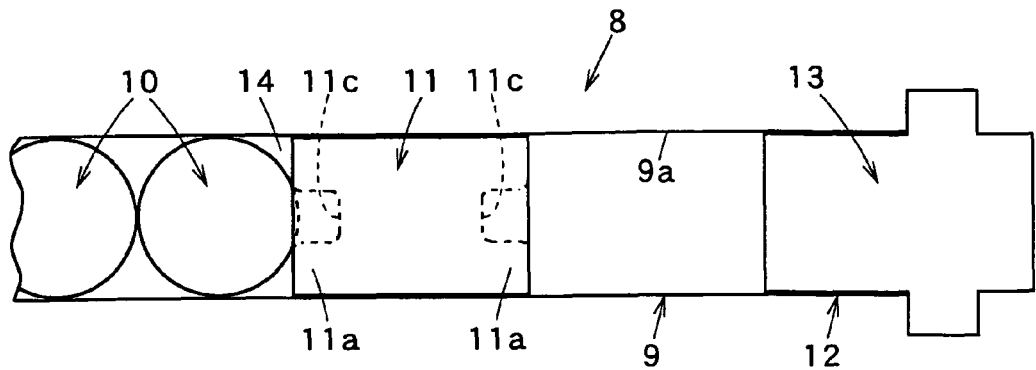
FIG. 2(a)
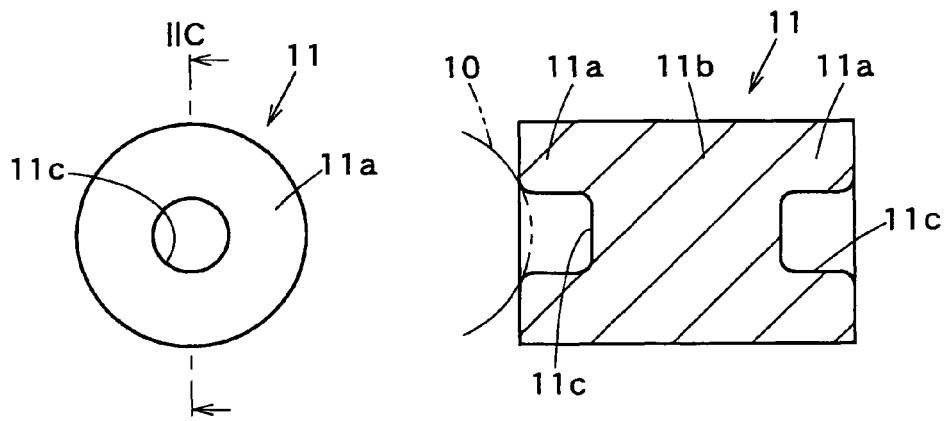
FIG. 2(b)
FIG. 2(c)
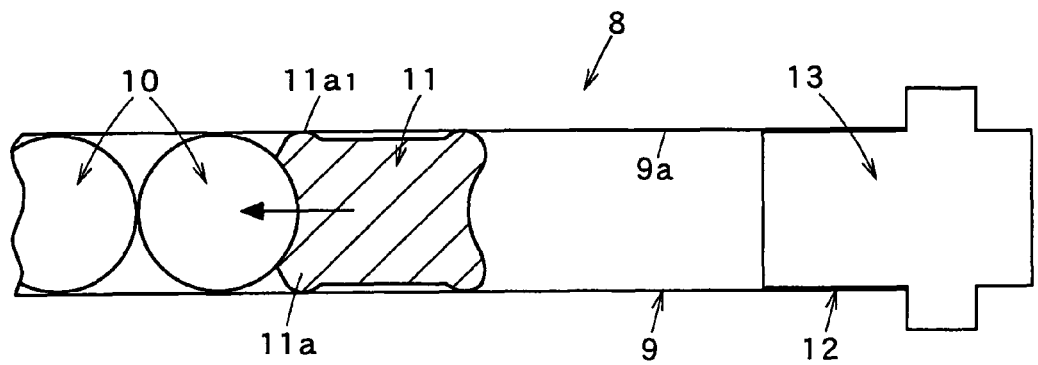
FIG. 2(d)

PRETENSIONER, SEAT BELT RETRACTOR HAVING THE SAME, AND SEAT BELT APPARATUS PROVIDED THEREWITH

BACKGROUND

The present application relates to the technical field of pretensioners for causing a seat belt to increase an occupant restraint force by rotating the spool of a seat belt retractor using reactive gas in the direction in which the seat belt is taken up at the onset of an emergency such as a vehicle crash, the technical field of pretensioners for taking up the seat belt, and the technical field of seat belt apparatuses in a vehicle.

Various types of seat belt retractors provided with a pretensioner have hitherto been devised for use in a seat belt apparatus provided on a vehicle such as an automobile. At the onset of an emergency, such as a vehicle crash, in which a deceleration greater than a usual deceleration acts on a vehicle, such a pretensioner triggers a gas generator for producing reactive gas which in turns rotates the spool of the seat belt retractor in the take-up direction of the seat belt, thereby causing the spool to take up the seat belt. This removes slack from the seat belt in a prompt manner as well as provides the seat belt with a tension, thereby increasing an occupant restraint force.

As one example of conventional pretensioners, a pretensioner is known, which has a piston for producing a force upon receiving gas pressure caused by reactive gas and a plurality of force transmission components, each including a ball, for transmitting such a force produced by the piston to the belt take-up shaft of a seat belt retractor (see, for example, Japanese Unexamined Patent Application Publication No. 2001-63519 and Japanese Unexamined Patent Application Publication (Translation of PCT Application) No. 2002503168 (both incorporated by reference herein).

FIG. 4 is a diagram schematically showing part of one example of the pretensioner described in JP 2001-63519. FIG. 5(a) is a diagram schematically showing part of FIG. 4. In these figures, reference symbol a denotes a pretensioner (PT), b denotes a pipe having an opening at one end $b_1$ thereof, c denotes a plurality of force transmission components arranged so as to be movable inside the pipe b and in contact with one another, each of which includes a ball made of metal such as steel or aluminum, d denotes a piston including a ball made of a material having sealing properties such as a silicon rubber or a resin, e denotes a tubular pressure container connected to the base end section $b_2$ of the pipe b, f denotes a gas generator housed in the pressure container e, g denotes a ring gear movable into the pipe b through a cutout section $b_3$ located at the end of the pipe b, h denotes levers protruding from the outer circumferential surface of the ring gear g, i denotes internal teeth formed on the inner circumferential surface of the ring gear g, j denotes a spool for taking up the belt in a seat belt retractor, k denotes a pinion secured to the outer circumference of the spool j, m denotes external teeth formed on the outer circumferential surface of the pinion k, n denotes a case provided at the end $b_1$ of the pipe b for housing the force transmission components c ejected from the pipe b, o denotes a gear holder that maintains the ring gear g at a fixed position that does not allow the internal teeth i to be engaged with the external teeth m of the pinion k, and p and q denote a pair of pins provided at the gear holder o for holding the lever therebetween.

The ring gear g is normally held by the gear holder at the fixed position shown in the figures. When the ring gear g is located at this position, the internal teeth i of the ring gear g are not engaged with the external teeth m of the pinion k, which allows the spool j of the seat belt retractor to freely turn in either the seat belt winding direction or the seat belt unwinding direction. The first lever h enters the pipe b through the cutout section $b_3$ while being in contact with the first force transmission component c.

In the event of the aforementioned emergency, the gas generator f is triggered to produce reactive gas. Gas pressure resulting from such reactive gas acts on the piston d, which in turn exerts a pressing force on the force transmission components c. Accordingly, force produced by the piston d is transmitted to the lever h via the force transmission components c. Then, a pressing force is exerted on the lever h, causing the ring gear g to turn counterclockwise while moving to the right in FIG. 4. This causes the internal teeth i of the ring gear g to become engaged with the external teeth m of the pinion k, thereby transmitting rotation of the ring gear g to the pinion k in order to allow the pinion k to rotate counterclockwise, which in turn causes the spool j of the seat belt retractor to rotate in the same direction, namely, in the seat belt take-up direction. Consequently, the seat belt is taken up, which removes slack from the seat belt, thereby allowing the seat belt to increase an occupant restraint force.

FIG. 5(b) is a schematic diagram similar to FIG. 5(a), which shows part of one example of the pretensioner described in JP 2002-503168. As shown in FIG. 5(b), the pretensioner described in JP 2002-503168 employs a cylindrically-shaped piston, instead of a ball-shaped piston. The pretensioner described in JP 2002-503168 also performs nearly the same operation as the pretensioner described in JP 2001-63519.

As shown in FIG. 5(a), the pretensioner a described in JP 2001-63519 has a piston d consisting of a ball, whose shape results in a relatively large gap r between the piston d and a force transmission component c being in contact with the piston d as well as causes the piston d to be relatively difficult to deform so as to come into close contact with the inner wall $b_4$ of the pipe b when the piston d becomes activated to exert a pressing force on the force transmission component c. For this reason, the piston d suffers from an unsatisfactory sealing performance, which causes reactive gas generated by the gas generator f to lose gas pressure, raising concerns that gas pressure resulting from reactive gas is not effectively transmitted to the force transmission component c.

As shown in FIG. 5(b), the cylindrically-shaped piston d described in JP 2002-503168 also has the same reactive gas pressure loss as the pretensioner a described in the aforementioned JP 2001-63519.

SUMMARY

Accordingly, the present invention has been achieved in light of the foregoing and an object thereof is to provide a pretensioner, a seat belt retractor, and a seat belt apparatus which can enhance the sealing performance of the piston and thereby prevent reactive gas from losing gas pressure wherever possible.

To solve the foregoing problems, a pretensioner includes at least a pipe, a plurality of force transmission components that are provided so as to be movable inside the pipe and transmit a force for rotating a spool in the seat belt take-up direction, a gas generator for generating gas in the event of an emergency, and a piston that is provided so as to be movable inside the pipe and exerts a pressing force on the force transmission components when activated by gas pressure resulting from the gas, wherein the piston has an expanding section at one end thereof contacting the force transmission component, which expands toward the inner circumferential surface of the pipe when the piston exerts a pressing force on the force transmission component.

Also, in the pretensioner, the piston has a piston body, wherein the expanding section is formed integrally with the piston body at an end of the piston body so as to form a single component, the end being in contact with the force transmission component.

Furthermore, in the disclosed pretensioner, since being formed in an annular shape, the expanding section has a recessed portion formed therein, wherein the recessed portion has a cross-sectional shape along the lengthwise direction of the piston, which is any one of a cylindrical shape, a conical shape, a frusto-conical shape, and a U shape.

On the other hand, the seat belt retractor includes at least a seat belt, a spool for taking up the seat belt, and a pretensioner for rotating the spool in the seat belt take-up direction in the event of an emergency, wherein the pretensioner is any one of the pretensioners described herein.

Also, the seat belt apparatus according to the present invention includes at least a seat belt retractor for taking up the seat belt, a tongue slidably supported by the seat belt, and a buckle provided on a vehicle body to which the tongue is removably attached, wherein the seat belt retractor is the seat belt retractor according to the present invention.

Since the piston of the pretensioner has the expanding section at an end thereof contacting the force transmission component, the pretensioner, seat belt retractor, and seat belt apparatus according to the present invention allow the force transmission component to expand the expanding section toward the inner circumferential surface of the pipe when the piston is activated to exert a pressing force on the force transmission components upon receiving gas pressure resulting from reactive gas generated by the gas generator in the event of an emergency. Accordingly, the outer circumferential surface of the expanding section on the piston is more effectively brought into close contact with the inner circumferential surface of the pipe, resulting in improved sealing between the piston and the inner circumferential surface of the pipe. This prevents the reactive gas from losing pressure, thereby allowing the gas pressure to more effectively act on the piston. As a result, the piston exerts a greater pressing force on the force transmission component, thereby allowing the pretensioner to effectively take up the seat belt at the onset of an emergency.

In addition, since the expanding section has a recessed portion provided therein, part of the piston can be brought into the recessed portion when the piston comes into contact with the force transmission component. For this reason, a gap created when the piston comes into contact with the force transmission component can be rendered smaller as compared with that in conventional pretensioners. Accordingly, this makes it difficult to cause the expanding section to move away into the gap when the expanding section expands. As a result, since the gas pressure loss can be further reduced in an effective manner, gas pressure acting on the piston allows the piston to more efficiently produce pressing pressure.

Furthermore, since the expanding section is formed integrally with the piston body to form a single component, the number of parts cab be reduced, resulting in simplified piston structure.

BRIEF DESCRIPTION OF THE DRAWINGS

FIG. 2(a) is a fragmentary view schematically showing part of the pretensioner illustrated by the example. FIG. 2(b) is a view showing a side of a piston end of the pretensioner, which contacts with a force transmission component. FIG. 2(c) is a cross-sectional view taken along the line IIC-IIC of FIG. 2(B). FIG. 2(d) is a diagram showing operation of the piston.

DETAILED DESCRIPTION

Figure 1:
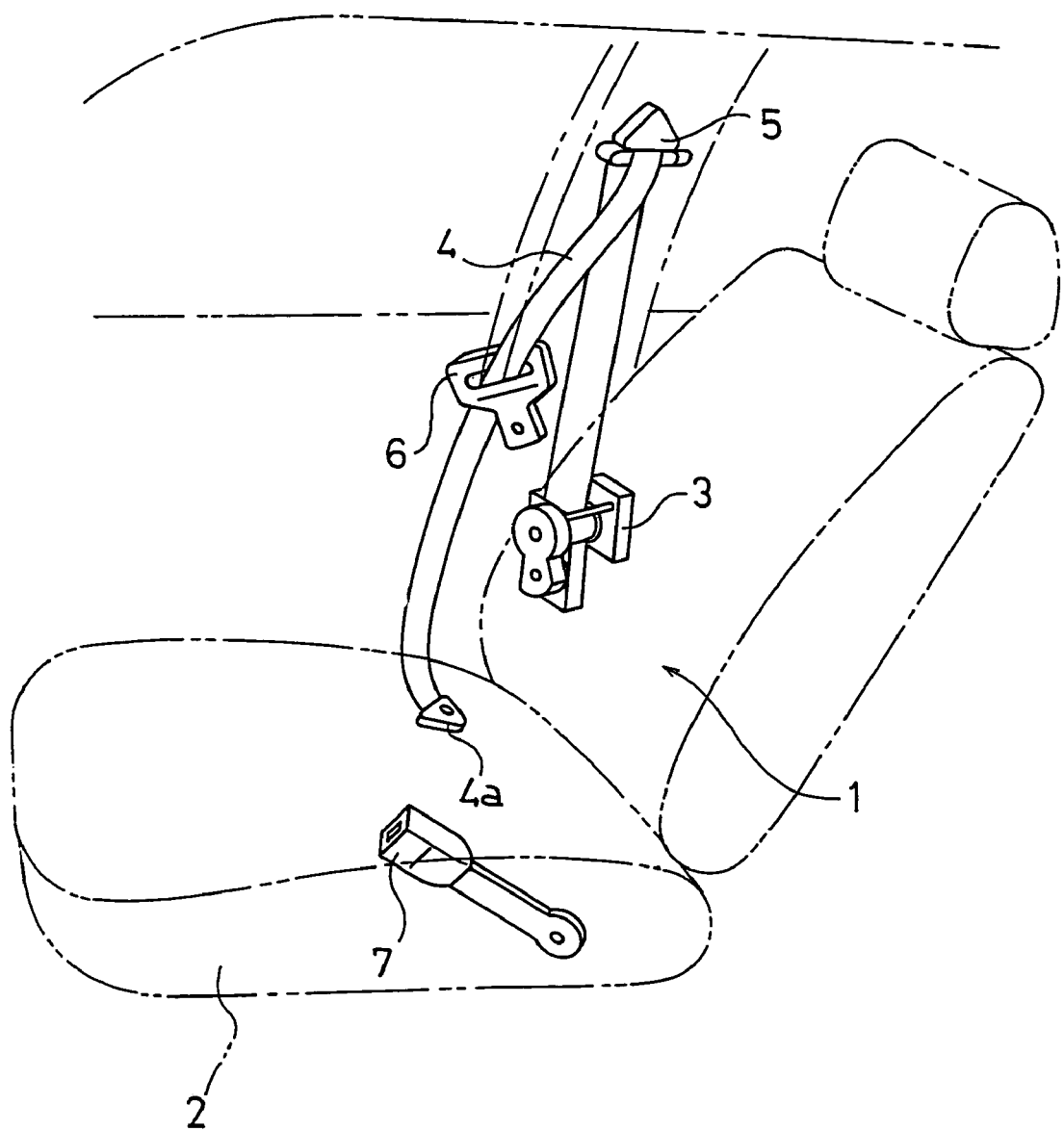
FIG. 1 is a diagram schematically showing a seat belt apparatus provided with a seat belt retractor having one example of a pretensioner according to an embodiment of the present invention.

FIG. 1 is a diagram schematically showing a seat belt apparatus provided with a seat belt retractor having a pretensioner according to an embodiment of the present invention.

As shown in FIG. 1, a seat belt apparatus 1 illustrated by this example is basically the same as a known conventional three-point seat belt apparatus. In this figure, reference numeral 1 denotes a seat belt apparatus, 2 denotes a vehicle seat, 3 denotes a seat belt retractor disposed in the vicinity of the vehicle seat 2, 4 denotes a seat belt unwindably wound by the seat belt retractor 4 in which a belt anchor 4a attached to one end of the seat belt is secured to a vehicle floor or the vehicle seat 2, 5 denotes a guide anchor that guides the seat belt 4 unwound from the seat belt retractor 3 to the shoulder of an occupant, 6 denotes a tongue slidably supported by the seat belt 4 guided by the guide anchor 5, and 7 denotes a buckle secured to the vehicle floor or the vehicle seat, with which the tongue 6 is disengageably engaged.

Wearing and releasing the seat belt 4 in the seat belt apparatus 1 are the same as those of a known conventional seat belt apparatus.

The seat belt retractor 3 illustrated by this example is a known conventional emergency locking type seat belt retractor (ELR) or a known conventional automatic locking type seat belt retractor (ALR) (for example, see Japanese Unexamined Patent Application Publication No. 2003-191822). For this type of seat belt retractor 3, a seat belt retractor 3 provided with a pretensioner is known. Like a known conventional pretensioner, such a pretensioner becomes activated when deceleration much greater than the deceleration associated with normal operation is exerted on a vehicle in the event of a vehicle crash or the like, rotating the spool of the seat belt retractor 3 in the seat belt take-up direction and thereby taking up the seat belt 4 by a predetermined amount for increasing an occupant restraint force.

The seat belt retractor 3 illustrated by this example is provided with a pretensioner. Such a pretensioner is basically the same as a known conventional pretensioner described in the aforementioned JP 2001-63519. For this reason, the differences in structure from the pretensioner described in JP 2001-63519 are described below.

As shown in FIG. 2(a), a pretensioner 8 illustrated by this example has a plurality of force transmission components 10, each including a ball, and a piston 11 in a pipe 9, as is the case with a pretensioner described in JP 2001-63519. Also, a gas generator 13 is housed in a pressure container 12 connected to the pipe 9.

As shown in FIGS. 2(a) and 2(c), the piston 11 in the pretensioner 8 illustrated by this example has an expanding section 11a formed at one end thereof contacting the force transmission components 10. The expanding section has an annular shape and is formed at an end of a piston body 11b in an integral manner so as to form a single component. Accordingly, the expanding section 11a has a recessed portion 11c that includes a hole whose cross-sectional shape along the lengthwise direction of the piston 11 (or moving direction of the piston 11) is a cylindrical shape. The center of the recessed portion 11c is adapted to coincide with that of the piston body 11b. Likewise, the expanding section 11a is also formed at the other end of the piston body 11b in an integral manner to form a single component. For this reason, the piston 11 has no directionality, thereby preventing an erroneous assembling of the piston 11. As is the case with a piston described in the aforementioned JP 2001-63519, the piston is made of a heat-resistant resilient material, such as a silicon rubber or a resin.

In the pretensioner illustrated by this example, when the gas generator is triggered to produce reactive gas in the event of an emergency, gas pressure resulting from such reactive gas acts on the piston 11. As shown in FIG. 2(a), this causes the piston 11 to come into contact with the force transmission component 10. At this time, as shown in FIGS. 2(a) and 2(c), part of the force transmission component 10 enters the recessed portion 11c, resulting in a reduction in the gap 14 between the force transmission component 10 and the piston 11 inside the pipe 9, as compared with that in conventional pretensioners. Also, since the center of the recessed portion 11c coincides with that of the piston body 11b, the force transmission component 10 is centered with respect to the piston 11 when part of the force transmission component 10 enters the recessed portion 11c. This allows the piston 11 to exert a pressing force on the force transmission component 10 without being decentered with respect to the force transmission component 10. Accordingly, unbalanced load is prevented from acting on the force transmission component 10, thereby allowing a force produced by the piston 11 to be effectively transmitted through the force transmission component 10.

After the piston 11 comes into contact with the force transmission component 10, gas pressure presses the piston 11 against the force transmission component 10, which causes the expanding section 11a of the piston 11 to expand toward the inner circumferential surface 9a of the pipe 9, causing the outer circumferential surface $11a_1$ of the expanding section 11a to be brought into close contact with the inner circumferential surface 9a. This results in improved sealing between the piston 11 and the inner circumferential surface 9a of the pipe 9. Accordingly, pressure loss of the reactive gas is suppressed, thereby causing gas pressure to more effectively act on the piston 11, which in turn exerts a greater pressing force on the force transmission component 10. As a result, at the onset of an emergency, the pretensioner takes up the seat belt 4 in an effective manner.

In addition, since the gap 14 is smaller than that in conventional pretensioners when the piston 11 comes into contact with the force transmission component 10, the expanding section 11a has difficulty in moving toward the gap 14 when expanding. As a result, the gas pressure acting on the piston 11 allows the piston 11 to more effectively produce a pressing force, resulting in further reduction in gas pressure loss. Furthermore, gas pressure resulting from the reactive gas allows an expanding section 11a located at the other end of the piston 14 to expand at the same time, thereby further reducing a gas pressure loss, which leads to further effective use of the gas pressure.

As is the case with the pretensioner descried in the aforementioned JP 2001-63519, a pressing force exerted by the piston 11 through the force transmission component 10 rotates the spool of the seat belt retractor 3 in the seat belt take-up direction, thereby taking up the seat belt 4. This heightens an occupant restraint force at the onset of an emergency.

Since the piston 11 has the expanding section 11a at one end thereof contacting the force transmission component 10, the pretensioner 8 illustrated by this example allows the force transmission components 10 to expand the expanding section 11a toward the inner circumferential surface 9a of the pipe 9 when the piston 11 becomes activated to push the force transmission components 10 upon receiving gas pressure resulting from reactive gas generated by the gas generator 13 in the event of an emergency. Accordingly, the outer circumferential surface $11a_1$ of the expanding section 11a on the piston 11 is more effectively brought into close contact with the inner circumferential surface 9a of the pipe 9, resulting in improved sealing between the piston 11 and the inner circumferential surface 9a of the pipe 9. This prevents the reactive gas from losing pressure, thereby allowing the gas pressure to more effectively act on the piston 11. As a result, the piston 11 exerts a greater pressing force on the force transmission components 10, thereby allowing the pretensioner to effectively take up the seat belt 4 at the onset of an emergency.

In addition, since the expanding section 11a has a recessed portion 11c formed therein, part of the piston 11 can be brought into the recessed portion 11c when the piston 11 comes into contact with the force transmission component 10. For this reason, a gap 14 created when the piston 11 comes into contact with the force transmission component 10 can be rendered smaller as compared with that in conventional pretensioners. Accordingly, this makes it difficult to cause the expanding section 11a to move away into the gap 14 when the expanding section 11a expands. As a result, since gas pressure loss can be further reduced in an effective manner, gas pressure acting on the piston 11 allows the piston 11 to more efficiently produce pressing pressure. Also, gas pressure resulting from the reactive gas is adapted to allow an expanding section 11a located at the other end of the piston 14 to expand at the same time, thereby further reducing a gas pressure loss, which leads to further effective use of the gas pressure.

In addition, since the center of the recessed portion 11c is adapted to coincide with that of the piston body 11b, the force transmission component 10 is centered with respect to the piston 11 when part of the force transmission component 10 enters the recessed portion 11c. This allows the force transmission component 10 to be subjected to no unbalanced load, thereby enabling a force produced by the piston 11 to be effectively transmitted through the force transmission component 10.

Additionally, the piston 11b has expanding sections 11a provided at both ends thereof, eliminating the directionality of the piston 11. This results in prevention of erroneous assembling of the piston 11.

Furthermore, since the expanding section 11a is formed integrally with the piston body 11b to form a single component, the number of parts cab be reduced, thereby simplifying the structure of the piston 11.

Other configuration and other effect and advantage of this example are the same as those of the pretensioner described in JP 2001-63519, and are omitted because they can be understood with reference to JP 2001-63519.

Figure 3A:
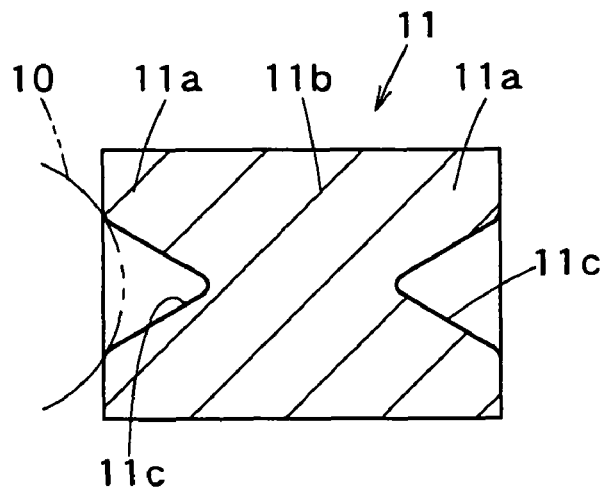
FIGS. 3(a) through 3(c) are diagrams showing modifications of the pretensioner according to the present invention.
Figure 3B:
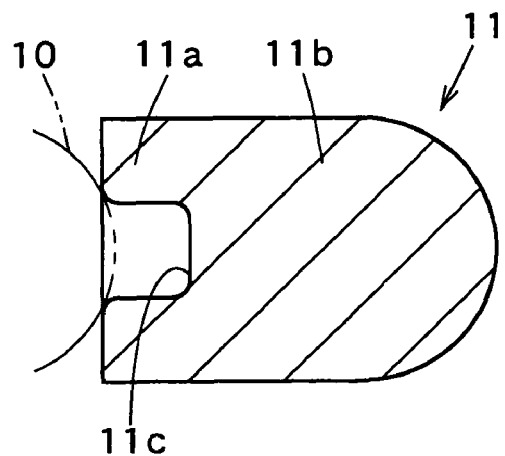
Figure 3C:
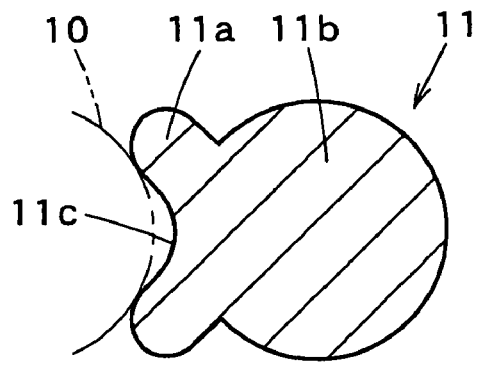
Figure 4:
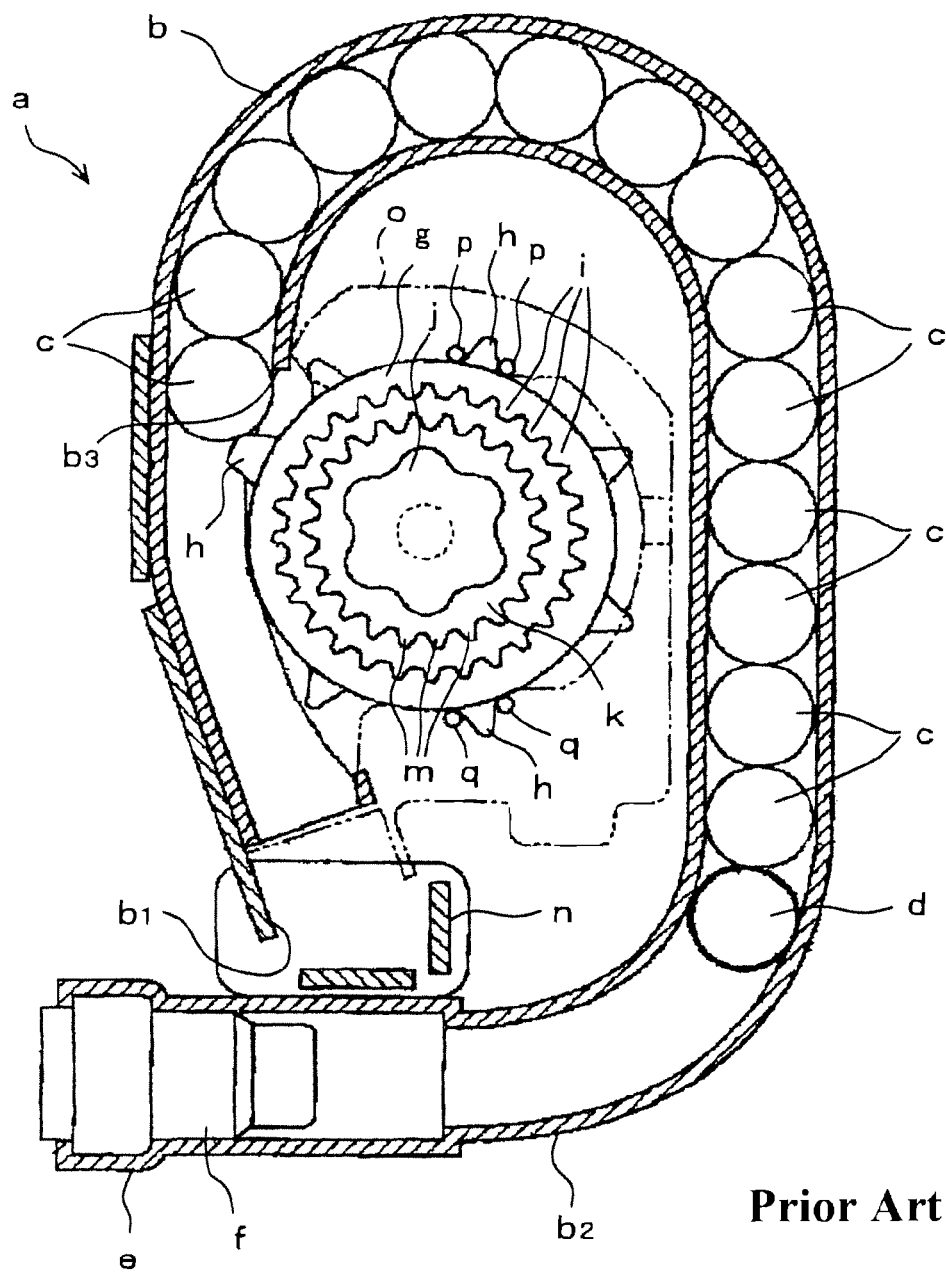
FIG. 4 is a diagram schematically showing a pretensioner described in Patent JP 2001-63519.
Figure 5A:
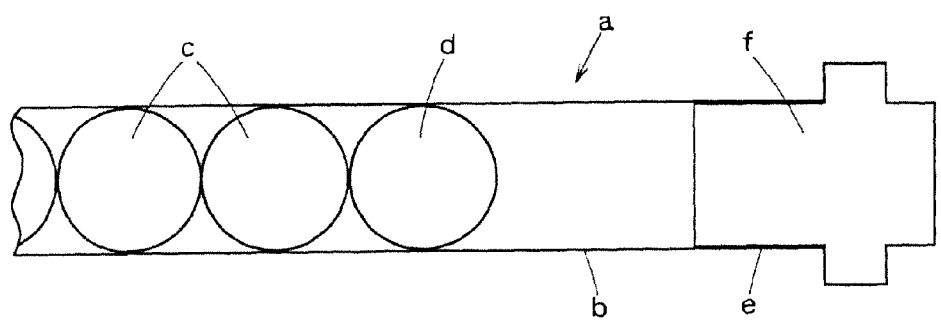
FIG. 5(a) is a fragmentary view schematically showing part of a pretensioner described in JP 2001-63519.
Figure 5B:
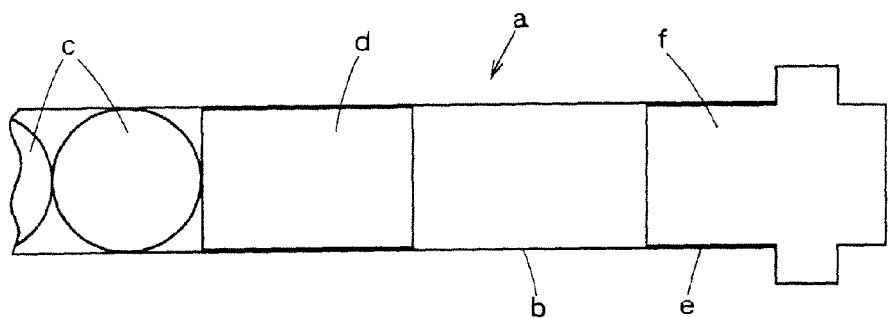
FIG. 5(b) is a fragmentary view schematically showing part of a pretensioner described in JP 2002-503168.

FIGS. 3(a) through 3(c) show examples of modifications to the pretensioner according to the present invention.

In an example of a modified pretensioner shown in FIG. 3(a), the recessed portion 11c has a cross-section along the lengthwise direction of the piston 11 formed in a conical shape whose bottom face is an opened end thereof, instead of a cylindrically-shaped recessed portion 11c in the piston 11 illustrated by the aforementioned example. Other configuration and other effect and advantage of such a modified pretensioner 8 are the same as those in the foregoing example shown in FIG. 2. The recessed portion 11c may have a cross section along the lengthwise direction of the piston 11 formed in a U shape, a frusto-conical shape, or other shape.

In an example of a modified pretensioner shown in FIG. 3(b), the piston 11 has an expanding section 11a formed at only one side of the piston 11b, which contacts with the force transmission component in the piston body 11b, although the piston 11 illustrated by the aforementioned example has an expanding section 11a formed at either side of the piston body 11b. In addition, in this example of modifications, the other side of the piston body 11b is formed in a spherical shape. In this example, since the piston 11 has directionality, the effect of erroneous assembly prevention is not provided. Other configuration and other effect and advantage of the pretensioner 8 illustrated by this example of modifications are the same as those in the foregoing example shown in FIG. 2.

Furthermore, in an example of a modified pretensioner shown in FIG. 3(c), the piston 11 has the piston body 11b formed in a spherical shape although the piston 11 illustrated by the aforementioned example of modifications shown in FIG. 3(b) has the piston body 11b formed in a cylindrical shape. The expanding section 11a is formed in a frusto-conical projection whose cross-section along the lengthwise direction of the piston 11 is V-shaped or U-shaped. Other configuration and other effect and advantage of the pretensioner 8 illustrated by this example of modifications are the same as those in the foregoing example shown in FIG. 2.

Various modifications are conceivable within the scope of the present invention. For example, a force transmission component 10 may be made of a component other than a ball. In such a case, preferably the force transmission component 10 has its one end contacting a piston 11a formed at least in a spherical shape for allowing the expanding section 11a to easily expand. A pretensioner, a seat belt retractor, and a seat belt apparatus according to the present invention are not limited to the foregoing examples. Various modifications are conceivable within the scope of the claims.

The pretensioner, the seat belt retractor, and the seat belt apparatus according to the present invention can be applied to pretensioners, seat belt retractors, and automotive seat belt apparatuses, the pretensioners being provided in seat belt retractors for taking up a seat belt and employing a plurality of balls.

Japan Priority Application 2009-111978, filed May 1, 2009, including the specification, drawings, claims and abstract, is incorporated herein by reference in its entirety.

What is claimed is:

1. A pretensioner comprising:
    a pipe;
    a plurality of force transmission components that are provided so as to be movable in the pipe and transmit a force for rotating a spool in a direction in which a seat belt is taken up;
    a gas generator for generating gas in an event of an emergency; and
    a piston that is provided so as to be movable in the pipe and configured to, when activated by gas pressure resulting from the gas, exert a pressing force on the force transmission components,
    wherein the piston has an expanding section formed at an end thereof, the expanding section being configured to make contact with the force transmission components,
    wherein the expanding section has a recessed portion formed therein, and
    wherein the expanding section is configured such that a part of an inner circumferential surface of the recessed portion abuts on one of the force transmission components when the piston is operated by the gas pressure of the gas, and the expanding section is caused to expand toward an inner circumferential surface of the pipe by a section of said one of the force transmission components abutting on the inner circumferential surface of the recessed portion when the piston exerts the pressing force on the force transmission components and the one of the force transmission components advances into the recessed portion.

2. The pretensioner according to claim 1, wherein the piston has a piston body and the expanding section is formed integrally with the piston body at an end of the piston body so as to form a single component, the end of the piston body being in contact with the force transmission components.

3. The pretensioner according to claim 2, wherein the expanding section is formed in an annular shape and the recessed portion has a cross-sectional shape along a lengthwise direction of the piston, the cross-sectional shape of the recessed portion being one of a cylindrical shape, a conical shape, a frusto-conical shape, and a U shape.

4. A seat belt retractor using the pretensioner according to claim 1, comprising:
    the seat belt;
    the spool for taking up the seat belt; and
    the pretensioner as described in claim 1 for rotating the spool in the direction in which the seat belt is taken up in the event of an emergency.

5. A seat belt apparatus using the seat belt retractor according to claim 4, comprising:
    the seat belt retractor as described in claim 4 for taking up the seat belt;
    a tongue slidably supported by the seat belt; and
    a buckle provided in a vehicle body to which the tongue is removably attached.

6. The pretensioner according to claim 1, wherein the piston has a piston body and the expanding section is formed integrally with the piston body at an end of the piston body so as to form a single unitary component of a same material.

7. The pretensioner according to claim 6, wherein the end of the piston body is configured to be in contact with the one of the force transmission components when the piston exerts the pressing force on the force transmission components.

8. The pretensioner according to claim 1, wherein the piston has another recessed portion formed at another end thereof.

9. The pretensioner according to claim 1, wherein the recessed portion has a cross-sectional shape along a lengthwise direction of the piston, the cross-sectional shape of the recessed portion being one of a cylindrical shape, a conical shape, a frusto-conical shape, and a U shape.

10. The pretensioner according to claim 1, wherein the expanding section is configured such that a gap is disposed between a bottom section of the recessed portion of the piston and the one of the force transmission components before the piston is operated by the gas pressure of the gas, and the gap becomes smaller when the piston is operated by the gas pressure of the gas.

11. The pretensioner according to claim 10, wherein the bottom section of the recessed portion of the piston abuts the one of the force transmission components when the piston is operated by the gas pressure of the gas.

* * * * *